Patented Sept. 26, 1933

1,928,303

UNITED STATES PATENT OFFICE 1,928,303

PAVING COMPOSITION

Glenn H. Alvey, San Antonio, Tex., assignor to Uvalde Rock Asphalt Company, San Antonio, Tex., a corporation of Texas No Drawing. Application March 9, 1932
Serial No. 597,796

9 Claims. (Cl. 106—31)

This invention relates to paving compositions and is a continuation in part of applicant's copending application Serial No. 561,601, filed September 8, 1931.

More particularly the invention relates to the use of emulsified asphalt cement in asphalt compositions containing pulverized natural limestone rock asphalt and sand, gravel, crushed rock, or other suitable mineral aggregates generally used in such compositions as are adaptable for use as pavement surfaces for roads, streets, highways, sidewalks, foot-paths and similar purposes, including utilization under proper conditions as floor coverings, mastics, molding compositions and all such purposes for which asphalt compositions are useful.

Among the objects of this invention are the provision of means for manufacturing such compositions either hot or cold and handling, transporting, spreading and compressing them cold, or storing them for later use; while at the same time insuring the full advantage and merit residing in the use of pulverized natural limestone rock asphalt as a filler.

The advantages resulting from using such compositions cold are several, such as economy in manufacture; ability to prepare such compositions at points remote from the locality of their use, transporting them to the point of use and there using them at once or storing them for use at a later time; the ease of application, requiring only the most simple equipment and small crews of unskilled labor; adaptability to both new construction and maintenance with especial reference to economy in the case of small projects and intermittent use where the expense of elaborate equipment becomes burdensome; the compositions may be compressed immediately after their application and the pavement immediately opened to traffic, thus avoiding costly delays.

While it is true that compositions have been developed for cold application, such compositions generally contain a volatile solvent which requires evaporation before the mixture attains its maximum stability, thereby limiting such compositions to structural porosity compatible with the necessary evaporation of the diluent. Many of the so-called cold application compositions are so in name only, as experience has shown that they harden or stiffen during transportation or storage to such extent that they require heating before they can be economically handled and applied. So far as is known, none of the cold application products up to this time have embodied the superior qualities of pulverized natural limestone rock asphalt filler nor have they been satisfactorily susceptible to manufacture either hot or cold, while at the same time being actually and readily transportable, storable, workable and compressible without the application of heat and yet resulting in a final product of high stability, suitable for all conditions of traffic and climate and for application upon any adequate base or foundation.

The present invention relates particularly to the manufacture, either hot or cold, of a composition for cold application using an emulsified asphalt as the binding cement, which also acts as a softening agent for the naturally contained hard bitumen of the pulverized natural limestone rock asphalt filler, and describes in detail new advantages accruing from the use of emulsified asphalt and how these may be obtained in actual practice.

The use of emulsified asphalt has not been successful in the case of fine grained silica sands due to the tendency of the bitumen coating of the sand grains to strip or peel off during manipulation while the emulsion is in the process of breaking or curing, thus rendering such compositions useless. Three separate manufacturing procedures have been found which will prevent this troublesome stripping of the bitumen from the surface of the mineral particles and at the same time produce compositions which are surprisingly workable and compressible under the conditions and with the equipment common to the construction of bituminous pavement surfaces.

For the purpose of description of design and preparation, one composition of the sheet asphalt type containing a silica sand, pulverized natural limestone rock asphalt filler and emulsified asphalt, will be given. It is to be understood that this is solely for the purpose of description and must not be construed as a limitation since the same principles which apply to the design and preparation of mixture of the various type will be followed in the use of this filler and emulsified asphalt in this type or kind or grading of aggregates. In designing mixtures embodying the use of limestone rock asphalt dust the same procedure will be followed as is outlined in detail in application Serial No. 561,601, it being understood that trial and error methods of empirical design may be used but that the preferred method will follow the lines of rational design based upon a determination of the voids in the aggregate-filler combinations.

In the example, which is given for the purpose of description, material of the following characteristics were used:

Sand, being a washed silica sand showing the following analysis:

|  | Per cent |
|---|---|
| Passing 80-mesh sieve | 4.5 |
| Passing 40-mesh sieve | 22.7 |
| Passing 10-mesh sieve | 71.3 |
| Retained 10-mesh sieve | 1.5 |
| Specific gravity at 77° F | 2.644 |
| Voids, by volume | 32.3 |

*Pulverized natural limestone rock asphalt filler*

|  | Per cent |
|---|---|
| Passing 325-mesh sieve | 48.4 |
| Passing 200-mesh sieve | 17.0 |
| Passing 80-mesh sieve | 20.3 |
| Passing 40-mesh sieve | 12.6 |
| Passing 10-mesh sieve | 1.7 |
| Specific gravity at 77° F., native bitumen present | 2.342 |
| Specific gravity at 77° F., bitumen-free | 2.690 |
| Voids | 29.3 |
| Naturally contained bitumen | 11.1 |

*Emulsified asphalt*

Any of the water-external emulsified asphalts which are or may be commercially available and which are suitable for mixing operations may be used, providing they contain an asphalt of such consistency that when it becomes fluxed with the native bitumen of the natural limestone rock asphalt filler it will produce in the final composition an asphalt cement of desired consistency.

After the determination of the voids in the combination of the natural limestone rock asphalt dust and the sand or other mineral aggregates, the total bitumen required for the mixture is calculated to approximately fill the voids in the compacted mineral aggregate, and the mixture is then prepared in accordance with one of the following predetermined methods:

1. The raw, cold sand or other mineral aggregate in proper quantity is charged into the mixer which may be any mixing device suitable for the preparation of asphalt paving compositions (hand mixing may also be used if preferred), to which is added the full quantity of emulsified asphalt required in the composition, and the two mixed together until the mineral aggregate is thoroughly coated with the emulsion. Then the predetermined charge of natural limestone rock asphalt filler is added and the whole thoroughly mixed until a uniform color results indicating that the fine particles of the filler have become thoroughly distributed and have attached themselves to the bitumen coated mineral particles. While these ingredients are still in the mixer, a small amount of water is added which may be an amount equal to approximately twenty per cent of the weight of the rock asphalt filler contained in the final composition. The mixing is then continued until the water has become thoroughly dispersed throughout the mixture.

It is obvious that the additional water can be dispensed with for several reasons. For example, emulsion may be used which contains the necessary additional water; the emulsion may be diluted with water prior to using; in some cases the aggregate itself may contain sufficient moisture to preclude the use of the additional water.

2. The procedure is exactly the same as outlined under No. 1 above except that the sand or other mineral aggregate shall have been previously heat treated to a relatively high temperature such as 700° F. more or less in the case of silica sand, after which the aggregate has been allowed to cool to air temperature before its introduction into the mixture.

3. The sand or other mineral aggregate having first been heated to a temperature of from 250 to 400° F. more or less, is deposited in the mixer. The cold asphalt emulsion is then introduced and the two ingredients thoroughly mixed after which the dry rock asphalt filler is added. From this point the procedure is exactly as outlined under No. 1 above.

The procedure of any of the above methods of mixture preparation may be modified to include the preheating of the natural limestone rock asphalt filler dust to a temperature of from 200 to 240° F. more or less in order to draw the naturally contained bitumen to the surface of the filler grains.

In manufacturing asphalt compositions within the scope of this invention, the plant equipment, tools and procedure common to the industry can be used without modification.

From this point on the prepared mixture may be stored for later use or immediately applied upon the base or foundation, compressed by rolling or tamping, and opened to traffic.

I claim:

1. A method of preparing a bituminous paving composition adaptable to compression in an unheated condition consisting in mixing non-bituminous mineral aggregate with a water external bituminous emulsion until the former is thoroughly coated with the emulsion, adding previously heat treated pulverized bitumen-containing filler to the mixture, and finally supplying an additional amount of water and continuing the mixing operation until homogeneous.

2. A method of preparing a bituminous paving composition adaptable to compression in an unheated condition, which consists in mixing air-temperature non-bituminous mineral aggregate, previously heat-treated to a temperature of approximately 700° Fahrenheit, with a water external bituminous emulsion until the latter thoroughly coats the former and adding pulverized bitumen-containing filler and continuing the mixing operation until a homogeneous mixture results.

3. A method of preparing a bituminous paving composition adaptable to compression in an unheated condition, which consists in mixing air-temperature non-bituminous mineral aggregate, previously heat-treated to a temperature of approximately 700° Fahrenheit, with a water external bituminous emulsion until the latter thoroughly coats the former and adding pulverized bitumen-containing filler and finally supplying an additional amount of water and continuing the mixing operation until a homogeneous mixture results.

4. A method of preparing a bituminous paving composition adaptable to compression in an unheated condition which consists in mixing air-temperature non-bituminous mineral aggregate, previously heat-treated to a temperature of approximately 700° Fahrenheit with a water external bituminous emulsion until the latter thoroughly coats the former and adding pulverized bitumen-containing filler which has been previously heat-treated and continuing the mixing operation until a homogeneous mixture results.

5. The method of preparing a paving composition which consists in mixing mineral aggregate with emulsified asphalt until the former is thoroughly coated with the emulsion, adding pulverized natural limestone rock asphalt to the mixture and finally supplying an amount of water equal approximately to twenty per cent of the weight of the rock asphalt filler contained in the final composition.

6. The method of preparing a paving composition which consists in mixing mineral aggregate heated to a temperature ranging from about 250 degrees to 400 degrees Fahrenheit with emulsified asphalt, adding natural limestone rock asphalt dust, and finally supplying water to the mixture in an amount equal approximately to twenty per cent of the weight of the rock asphalt filler contained in the final composition.

7. The method of preparing a paving composition which consists in mixing mineral aggregate heated to a temperature ranging from 250 degrees to 400 degrees Fahrenheit with emulsified asphalt, adding natural limestone rock asphalt dust preheated to a temperature about 200 degrees to 240 degrees Fahrenheit, and finally supplying water to the mixture in an amount equal approximately to twenty per cent of the weight of the rock asphalt filler contained in the final composition.

8. The method of preparing a paving composition which consists in mixing mineral aggregate preheated to a temperature of about 700 degrees Fahrenheit and cooled to air temperature with emulsified asphalt, adding natural limestone rock asphalt dust, and finally supplying water to the mixture in an amount equal approximately to twenty per cent of the weight of the rock asphalt filler contained in the final composition.

9. The method of preparing a paving composition which consists in mixing mineral aggregate preheated to a temperature of about 700 degrees Fahrenheit and cooled to air temperature with emulsified asphalt, adding natural limestone rock asphalt dust preheated to a temperature about 200 to 240 degrees Fahrenheit, and finally supplying water to the mixture in an amount equal approximately to twenty per cent of the weight of the rock asphalt filler contained in the final composition.

GLENN H. ALVEY.